(12) United States Patent
Arai et al.

(10) Patent No.: US 10,403,941 B2
(45) Date of Patent: Sep. 3, 2019

(54) TEMPERATURE CONTROLLER FOR BATTERY

(71) Applicant: TOYOTA JIDOSHA KABUSHIKI KAISHA, Toyota-shi, Aichi-ken (JP)

(72) Inventors: Kunihiko Arai, Owariasahi (JP); Yoshiaki Kawakami, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 495 days.

(21) Appl. No.: 14/913,118

(22) PCT Filed: Aug. 13, 2014

(86) PCT No.: PCT/IB2014/001518
§ 371 (c)(1),
(2) Date: Feb. 19, 2016

(87) PCT Pub. No.: WO2015/025206
PCT Pub. Date: Feb. 26, 2015

(65) Prior Publication Data
US 2016/0204488 A1  Jul. 14, 2016

(30) Foreign Application Priority Data

Aug. 20, 2013 (JP) ................................. 2013-170490

(51) Int. Cl.
*H01M 10/6569* (2014.01)
*H01M 10/613* (2014.01)
(Continued)

(52) U.S. Cl.
CPC ...... *H01M 10/613* (2015.04); *B60H 1/00278* (2013.01); *H01M 10/625* (2015.04);
(Continued)

(58) Field of Classification Search
CPC .......... H01M 10/6569; H01M 10/613; H01M 10/6552; H01M 10/6555; H01M 10/625;
(Continued)

(56) References Cited

U.S. PATENT DOCUMENTS

| 2012/0003510 A1 | 1/2012 | Eisenhour |
| 2012/0003515 A1 | 1/2012 | Eisenhour |

(Continued)

FOREIGN PATENT DOCUMENTS

| JP | 11-040211 A | 2/1999 |
| JP | 2009-009888 A | 1/2009 |

(Continued)

*Primary Examiner* — Stephen J Yanchuk
(74) *Attorney, Agent, or Firm* — Sughrue Mion, PLLC

(57) ABSTRACT

A temperature controller, for a battery, includes: a temperature control part configured to control a temperature of the battery by a phase change of a heat medium between a liquid phase and a gas phase; a gas phase flow passage through which a gas phase heat medium that flows out of the temperature control part flows; a heat medium cooling part configured to condense the gas phase heat medium that flows in from the gas phase flow passage; and a liquid phase flow passage through which the liquid phase heat medium flows from the heat medium cooling part to the temperature control part, the temperature control part and the heat medium cooling part being arranged such that a liquid surface of the liquid phase heat medium in the heat medium cooling part is positioned on an upper side than a liquid surface of the liquid phase heat medium in the temperature control part.

11 Claims, 7 Drawing Sheets

(51) Int. Cl.
  *H01M 10/625* (2014.01)
  *B60H 1/00* (2006.01)
  *H01M 10/657* (2014.01)
  *H01M 10/6552* (2014.01)
  *H01M 10/6555* (2014.01)
  *H01M 10/653* (2014.01)

(52) U.S. Cl.
  CPC ..... *H01M 10/657* (2015.04); *H01M 10/6552* (2015.04); *H01M 10/6555* (2015.04); *H01M 10/6569* (2015.04); *B60H 2001/00307* (2013.01); *H01M 10/653* (2015.04); *H01M 2220/20* (2013.01)

(58) Field of Classification Search
  CPC ............ H01M 10/653; H01M 2220/20; B60H 1/00278
  See application file for complete search history.

(56) References Cited

U.S. PATENT DOCUMENTS

| | | |
|---|---|---|
| 2012/0003521 A1 | 1/2012 | Sohn |
| 2012/0009455 A1 | 1/2012 | Yoon |
| 2012/0183830 A1* | 7/2012 | Schaefer ............ H01M 2/1077 429/120 |
| 2012/0270075 A1 | 10/2012 | Fujimura |
| 2013/0130080 A1* | 5/2013 | Yoon ................. H01M 10/6556 429/83 |
| 2015/0207190 A1 | 7/2015 | Takeshi et al. |

FOREIGN PATENT DOCUMENTS

| | | |
|---|---|---|
| JP | 2010-146883 A | 7/2010 |
| JP | 2011-183862 A | 9/2011 |
| JP | 2012-015112 A | 1/2012 |
| JP | 2012-226954 A | 11/2012 |
| JP | 2012-227072 A | 11/2012 |
| JP | 2013-012700 A | 1/2013 |
| JP | 2014-179194 A | 9/2014 |
| KR | 10-2012-0003375 A | 1/2012 |
| KR | 10-2012-0004322 A | 1/2012 |
| WO | 2012/003209 A1 | 1/2012 |

* cited by examiner

TEMPERATURE CONTROLLER FOR BATTERY

BACKGROUND OF THE INVENTION

1. Field of the Invention

The present invention relates to a temperature controller for a battery, in particular, a temperature controller for controlling a temperature of a battery by means of a heat medium.

2. Description of Related Art

Since a battery has a problem that when it is exposed to a high temperature, a durability life thereof decreases, it is desired to properly control a temperature of a battery. Devices for controlling a temperature of a battery have been disclosed in, for example, Japanese Patent Application Publication Nos. 2012-226954 (JP 2012-226954 A), 2011-183862 (JP 2011-183862 A), 2009-9888 (JP 2009-9888 A), 2012-227072 (JP 2012-227072 A) and 2013-012700 (JP 2013-012700 A) and so on.

JP 2011-183862 A discloses a structure in which in an on-vehicle battery made of a plurality of modules, the module is formed by mounting a heat pipe in a heat-exchangeable manner on a unit cell.

SUMMARY OF THE INVENTION

As was described above, although a temperature controller for a battery with a heat pipe has been known, a structure for efficiently operating the heat pipe such as a flow of a refrigerant in the heat pipe and so on have not been studied.

The present invention provides a temperature controller that can efficiently control a temperature of a battery.

A temperature controller for battery according to an aspect of the present invention is a temperature controller for controlling a temperature of a battery and includes a temperature control part, a gas phase flow passage, a heat medium cooling part and a liquid phase flow passage. The temperature control part controls the temperature of the battery by a phase change between a liquid phase and a gas phase of the heat medium. To the gas phase flow passage, the gas phase heat medium that flows out of the temperature control part flows in. The heat medium cooling part condenses the gas phase heat medium flowed in from the gas phase flow passage. The liquid phase heat medium flows from the heat medium cooling part to the temperature control part through the liquid phase flow passage. The temperature control part and the heat medium cooling part are arranged such that a liquid surface of the liquid phase heat medium in the heat medium cooling part is located above a liquid surface of the liquid phase heat medium in the temperature control part.

In the temperature controller described above, the temperature control part and the heat medium cooling part may be arranged such that a lower end of the heat medium cooling part is located above an upper end of the temperature control part.

In the temperature controller described above, the temperature control part may be extended along a longitudinal direction of the battery. The gas phase flow passage may be connected to one end part of the temperature control part in an extending direction of the temperature control part and the liquid phase flow passage may be connected to the other end part of the temperature control part.

In the temperature controller described above, the battery has a plurality of cells, and the cells may be stacked in the longitudinal direction of the battery. The temperature controller comes into contact with the temperature control part and may further include heat sinks arranged between the plurality of cells.

In the temperature controller described above, the liquid phase flow passage may incline to be lower from the heat medium cooling part toward the temperature control part.

In the temperature controller described above, the gas phase flow passage may incline to be higher from the temperature control part toward the heat medium cooling part.

In the temperature controller described above, the gas phase flow passage may be arranged separated from the battery.

In the temperature controller described above, the temperature control part may have a heating member for heating the heat medium. The heating member may heat the liquid phase heat medium accumulated in the temperature control part.

According to the temperature controller of an aspect of the present invention, a temperature of battery can be efficiently controlled.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
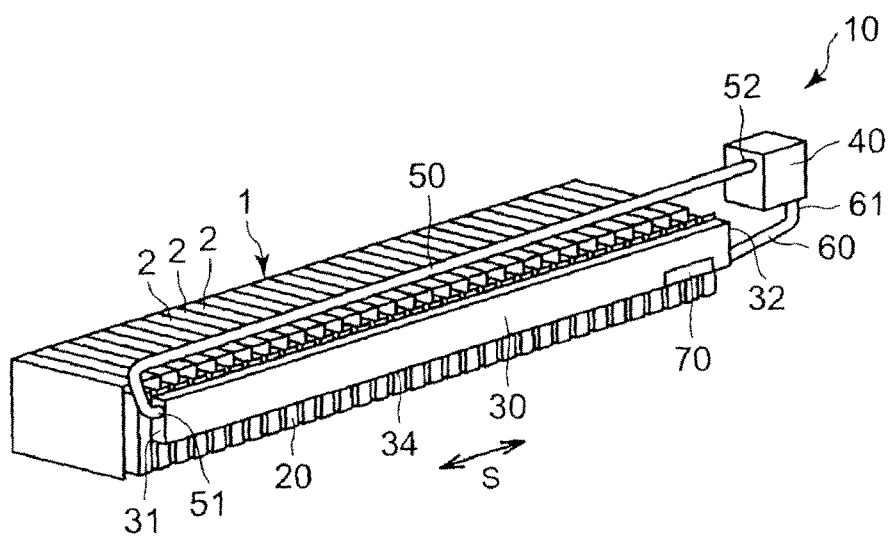
FIG. 1 is a perspective view that shows a schematic structure of a temperature controller for a battery according to an embodiment of the present invention.

Hereinafter, embodiments of the present invention will be described with reference to the drawings. In the drawings shown below, the like reference numerals indicate the like members or corresponding members, and descriptions thereof are not repeated.

Embodiment 1

[Structure of Temperature Controller 10 for Battery]

FIG. 1 is a perspective view that shows a schematic structure of a temperature controller 10 for a battery according to an embodiment of the present invention. The temperature controller 10 for a battery according to the present embodiment is used for controlling a temperature of a battery 1 in which a plurality of battery cells 2 are arranged in lamination. The battery 1 has a plurality of battery cells 2. The plurality of battery cells 2 are arranged in lamination along a stacking direction S and thus form the battery 1.

Each of the battery cells 2 has a shape of flat rectangular parallelepiped box. The battery cells 2 are stacked in a thickness direction thereof. The battery cell 2 has an electrode part (not shown) at an upper end part thereof. The plurality of battery cells 2 are electrically connected in series with each other via the electrode part. The battery cell 2 generally has a structure obtained in such a manner that lithium cobalt oxide ($LiCoO_2$) or lithium manganese oxide ($LiMnO_2$) is used in a positive electrode, graphite (C) is used in a negative electrode, a separator for insulation is interposed between the respective electrodes, after the respective electrode plates are stacked in several layers, together with an electrolytic solution, these are sealed by aluminum lamination. The battery cell 2 may have other shapes such as a cylindrical shape without restricting to the rectangular parallelepiped. Further, the battery 1 may include the battery cells 2 connected electrically in parallel.

At both end parts in the stacking direction S of the battery cells 2 that are arranged in lamination along the stacking direction S, a pair of end plates (not shown) is arranged. The pair of end plates is fixed with each other by a restraint member and the plurality of battery cells are sandwiched by the end plates, thus, the plurality of battery cells 2 are integrated and form the battery 1. The battery 1 has a slender rectangular box shape as a whole. The stacking direction S of the plurality of battery cells 2 corresponds to a longitudinal direction of the battery 1. The plurality of battery cells 2 are stacked in the longitudinal direction of the battery 1.

The temperature controller 10 for a battery includes a temperature control part 30. The temperature control part 30 is arranged at a position that faces a side surface of the battery 1. The temperature control part 30 has a flat slender rectangular box shape. The temperature control part 30 extends along the longitudinal direction of the battery 1. The temperature control part 30 is provided by being extended from one end to the other end of the battery 1 in the longitudinal direction thereof. The temperature control part 30 is provided so as to face at least two battery cells 2. The temperature control part 30 is provided over the plurality of battery cells 2. The temperature control part 30 is provided so as to face the battery cells 2 at both ends among the plurality of the battery cells 2 in the stacking direction S. The temperature control part 30 is manufactured from metal or an alloy excellent in the thermal conductivity such as copper, aluminum or the like.

The temperature control part 30 has a heating member 70. The heating member 70 is attached to an exterior surface of the temperature control part 30 or is arranged in an internal space of the temperature control part 30. The heating member 70 is arranged near a lower end 34 of the temperature control part 30. The heating member 70 is a member that generates heat by itself such as an electric heater or the like. Further, the heating member 70 may be a heat transfer member that receives heat transferred from the outside.

The temperature controller 10 for a battery includes a heat medium cooling part 40. The heat medium cooling part 40 is arranged at a position separated from the battery 1 and the temperature control part 30. The temperature controller 10 for a battery further includes a gas phase flow passage 50 and a liquid phase flow passage 60. The gas phase flow passage 50 and the liquid phase flow passage 60 join the temperature control part 30 and the heat medium cooling part 40. The gas phase flow passage 50 has an end part 51 on a side that is connected to the temperature control part 30 and an end part 52 on a side that is connected to the heat medium cooling part 40. The liquid phase flow passage 60 has an end part 61 on a side that is connected to the heat medium cooling part 40 and an end part 62 described below on a side that is connected to the temperature control part 30.

The temperature control part 30 has one end part 31 and the other end part 32 in an extending direction thereof (that is, the stacking direction S of the battery cells 2). The end part 51 of the gas phase flow passage 50 is connected to the end part 31 of the temperature control part 30. The end part 62 of the liquid phase flow passage 60 is connected to the end part 32 of the temperature control part 30. The gas phase flow passage 50 and the liquid phase flow passage 60 are connected to one and the other of a pair of surfaces that faces each other in the extending direction of the temperature control part 30. The gas phase flow passage 50 and the liquid phase flow passage 60 are connected respectively to the most separated positions of the exterior surface of the temperature control part 30. The end part 51 of the gas phase flow passage 50 is connected to the proximity of an upper end of the temperature control part 30. The end part 62 of the liquid phase flow passage 60 is connected to the proximity of a lower end of the temperature control part 30.

The temperature control part 30, the gas phase flow passage 50, the heat medium cooling part 40 and the liquid phase flow passage 60 are connected with each other and form a closed annular passage thereby. When a closed loop-like passage formed with the temperature control part 30, the gas phase flow passage 50, the heat medium cooling part 40 and the liquid phase flow passage 60 is hermetically sealed, evacuated, and the heat medium is encapsulated in the flow passage, the temperature controller 10 for a battery is formed thereby. The temperature controller 10 for a battery is a heat pipe that performs heat transfer by vaporization and condensation of the heat medium and has a loop-like thermosiphon structure in which a flow passage of a gas phase heat medium and a flow passage of a liquid phase heat medium are separated. As the heat medium, the heat medium that becomes a gas under normal temperature and normal pressure such as carbon dioxide, chlorofluorocarbons or the like can be used.

The gas phase flow passage 50 is arranged so as to curve upward from the end part 31 of the temperature control part 30 and circumvent the temperature control part 30. Since the gas phase flow passage 50 is arranged upward with respect to the battery 1, the gas phase flow passage 50 is arranged separated from the battery 1.

Figure 2:
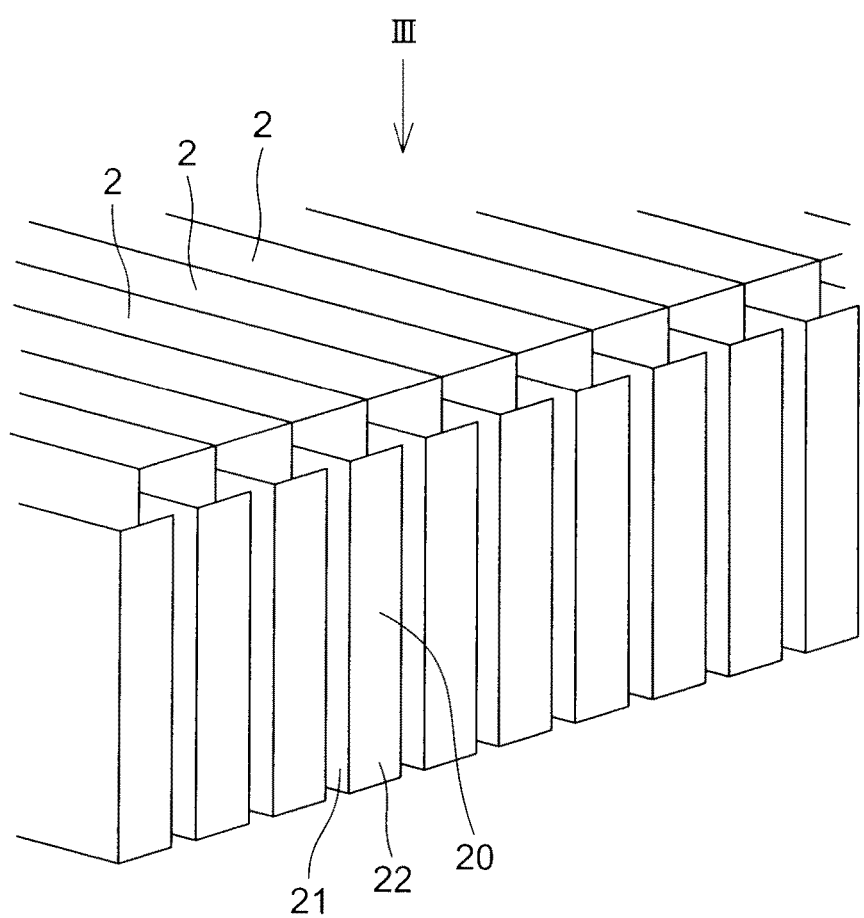
FIG. 2 is a perspective view that shows a structure of a heat sink in an enlarged view.
Figure 3:
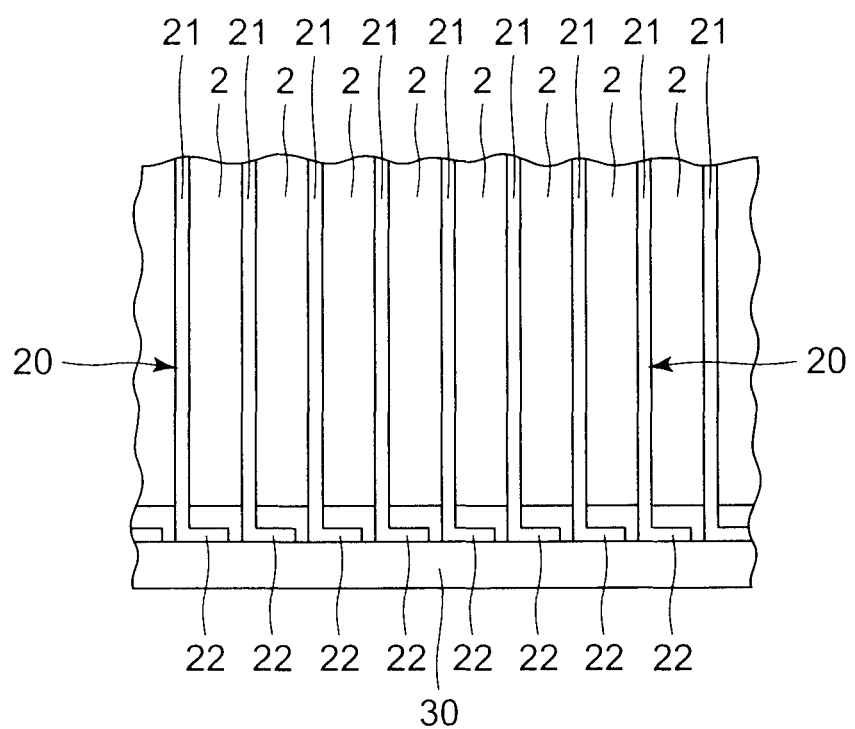
FIG. 3 is a plan view of a heat sink and a temperature control part seen from an arrow III direction in FIG. 2.

A heat sink 20 is arranged between the battery 1 and the temperature control part 30. FIG. 2 is a perspective view that shows a structure of the heat sink 20 in an enlarged view. FIG. 3 is a plan view of the heat sink 20 and the temperature control part 30 seen from a direction of arrow mark III of FIG. 2. As shown in FIG. 2 and FIG. 3, the heat sink 20 has an interlayer plate part 21 and a side wall plate part 22. The interlayer plate part 21 and the side wall plate part 22 have a tabular shape.

The interlayer plate part 21 is sandwiched by the battery cells 2 in the stacking direction S of the battery cells 2. The interlayer plate part 21 comes into surface contact with a main surface of the flat box-shaped battery cell 2 and is sandwiched by the battery cells 2 from both sides in the stacking direction S of the battery cells 2. In the stacking direction S of the battery cells 2, the battery cell 2 and the interlayer plate part 21 of the heat sink 20 are alternately arranged. The interlayer plate part 21 is arranged between two battery cells 2 and arranged in close contact with the battery cells 2.

In a plan view shown in FIG. 3, the interlayer plate part 21 extends in a vertical direction in the drawing, and the side wall plate part 22 extends in a horizontal direction in the drawing. One of end parts of the interlayer plate part 21 (an end part on a lower side in FIG. 3) is arranged at a position outside of the battery 1 separated from a side wall of the battery cell 2. The side wall plate part 22 is connected to the end part described above of the interlayer plate part 21. The interlayer plate part 21 extends in a direction orthogonal to the stacking direction S of the battery cells 2. The side wall plate part 22 extends in the stacking direction S of the battery cells 2. The side wall plate part 22 extends in a direction that intersects with the interlayer plate part 21. Therefore, the heat sink 20 forms an L-shaped plane as a whole.

A material of the heat sink 20 is not particularly restricted as long as it has excellent heat transport efficiency. However, when considering load bearing property, the heat sink 20 is preferable to be made of metal. As the metal, various metals such as aluminum, copper, iron or the like can be used. However, from the viewpoint of a lighter weight, aluminum is preferably used. Further, it is preferable to impart electric insulating property to the heat sink 20, and for this purpose, it is preferable to coat with an insulating material such as a resin or the like. As the resin, there is no particular restriction as long as it has an insulating property. However, polyethylene terephthalate (PET), for example, can be cited as preferable one.

With reference to FIG. 3, in the battery cells 2 and the heat sinks 20, which are arranged in lamination, on an exterior surface of the side wall plate part 22 of the heat sink 20, that is, on a surface on a side that does not face the battery cell 2 of a main surface of the tabular side wall plate part 22, the temperature control part 30 is arranged along a side surface of the battery 1. The temperature control part 30 is macroscopically in surface contact with an exterior surface of the side wall plate part 22 of the heat sink 20. The side wall plate part 22 is fixed by welding to a surface of the temperature control part 30. The temperature control part 30 and the heat sink 20 are integrated by welding. Since the temperature control part 30 and the heat sink 20 are formed as an integrated structural body, thermal resistance between the temperature control part 30 and the heat sink 20 is reduced.

The temperature control part 30 may be in a state that is in thermal contact with the side wall plate part 22, that is, a state in which heat is directly transferred between the temperature control part 30 and the side wall plate part 22, and the thermal transfer efficiency is sufficiently high. Therefore, it is not restricted to a structure in which the temperature control part 30 is welded to the side wall plate part 22. For example, the temperature control part 30 and the side wall plate part 22 may be integrated according to other method such as brazing, soldering or the like. Further, for example, a structure in which, by interposing a material having high thermal conductivity between the temperature control part 30 and the side wall plate part 22, the temperature control part 30 and the side wall plate part 22 are in indirect contact may be formed.

The interlayer plate part 21 of the heat sink 20 extends to a position outside of the battery 1, and, in a plan view of the heat sink 20, the side wall plate part 22 is arranged at a position separated with respect to a side surface of the battery cell 2. The interlayer plate part 21 protrudes from between two battery cells 2 that sandwich the interlayer plate part 21 and the side wall plate part 22 is arranged to the protruding tip. A gap is formed between the side wall plate part 22 and the side surface of the battery cell 2. As a result, between a surface of the temperature control part 30 that faces the battery cell 2 and the side surface of the battery cell 2, a gap is formed. The temperature control part 30 and the battery cells 2 may be in contact without the gap, in this case, the thermal transfer efficiency between the temperature control part 30 and the battery cells 2 can be preferably improved.

Since the heat sink 20 is in contact with the temperature control part 30 and arranged between a plurality of the battery cells 2, thermal transfer between the temperature control part 30 and the battery cells 2 is facilitated. Heat generated by the battery cells 2 is transferred to the temperature control part 30 via the heat sinks 20, and the heat is absorbed by the temperature control part 30. Thus, the heat from the battery cells 2 is externally radiated, a temperature of the battery cells 2 is suppressed from rising, and performance maintenance and longer life of the battery cells 2 can be achieved.

Figure 4:
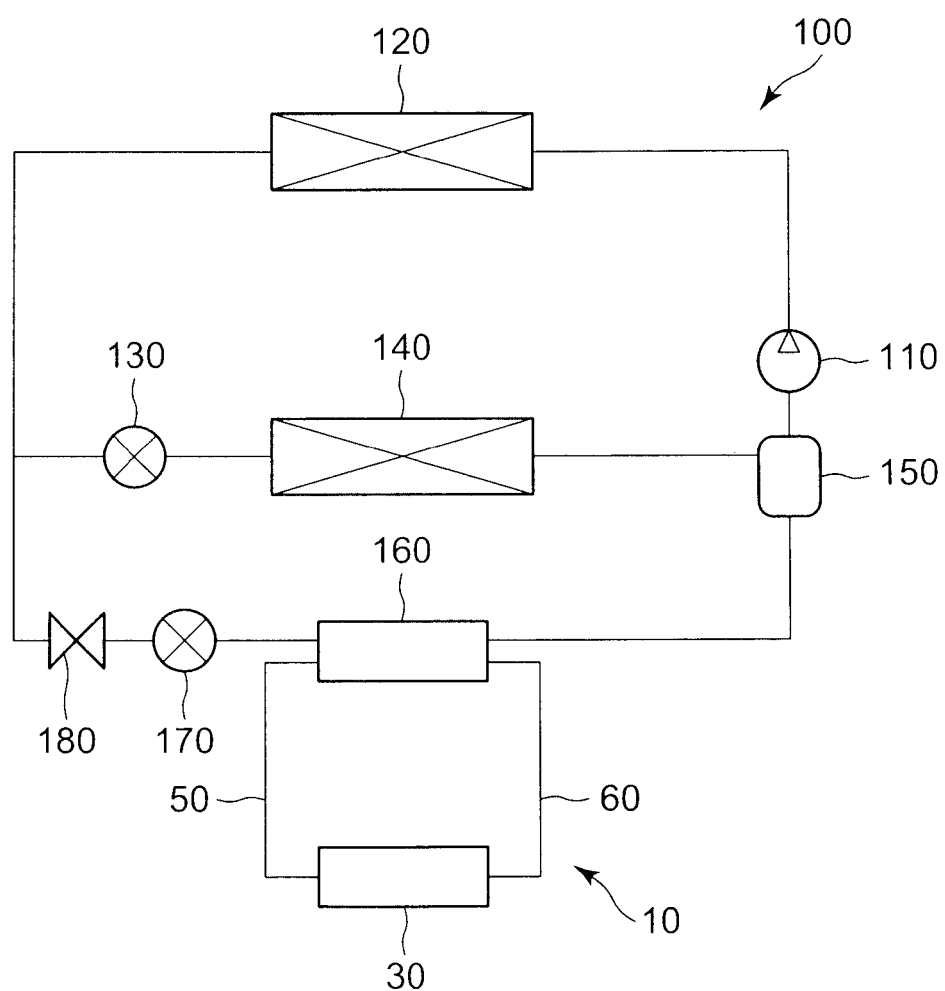
FIG. 4 is a schematic view that shows a structure of a refrigerating cycle for connecting the temperature controller for a battery according to the present embodiment.

FIG. 4 is a schematic view that shows a structure of a refrigerating cycle 100 for connecting the temperature controller 10 for a battery according to the present embodiment. The refrigerating cycle 100 shown in FIG. 4 is provided as an air conditioner for cooling a room for example. Cooling that uses the refrigerating cycle 100 is performed, for example, when a switch for cooling is switched on, or, when an automatic control mode for controlling such that a temperature in a room becomes automatically a preset temperature is selected, and the temperature in the room is higher than the preset temperature.

The refrigerating cycle 100 includes a compressor 110, a condenser 120, an expansion valve 130, and an evaporator 140. The compressor 110 adiabatically compresses a refrigerant, discharges the refrigerant in a superheated vapor state, and circulates the refrigerant to the refrigerating cycle 100 during operation of the refrigerating cycle 100. The condenser 120 makes the gas phase refrigerant that has been compressed in the compressor 110 a refrigerant liquid by isobarically radiating heat to an external medium. The expansion valve 130 expands the high pressure liquid phase refrigerant that is condensed by the condenser 120 and changes into a gas-liquid mixed state of low temperature and low pressure. The evaporator 140 absorbs heat of evaporation when a wet vapor refrigerant that is depressurized by the expansion valve 130 evaporates (vaporizes) and becomes a refrigerant gas from air-conditioning air in the surrounding which is introduced so as to come into contact with the evaporator 140.

The refrigerating cycle 100 includes an accumulator 150 that is provided on a passage of the refrigerant on an upstream side with respect to the compressor 110. The accumulator 150 is provided for maintaining a refrigerant that the compressor 110 sucks in at constant state. The accumulator 150 has a function of performing gas-liquid separation of the refrigerant when the refrigerant that flows in the accumulator 150 is in a gas-liquid two phase mixed state, storing the refrigerant liquid in the accumulator 150, and returning the gas phase refrigerant in a saturated vapor state to the compressor 110. The accumulator 150 makes only the refrigerant vapor in a gas state sucked in the compressor 110 and prevents the refrigerant liquid from flowing into the compressor 110.

The refrigerating cycle 100 further includes a heat exchanger 160, an expansion valve 170 and an electromagnetic valve 180. The heat exchanger 160, the expansion valve 170 and the electromagnetic valve 180 are connected in parallel with respect to the expansion valve 130 and the evaporator 140. The electromagnetic valve 180 is a valve that is designed to be switchable between a fully open state and a fully closed state. The expansion valve 170, the same as the expansion valve 130, expands the liquid refrigerant and changes it to a gas-liquid mixed state of low temperature and low pressure. The heat exchanger 160 performs heat exchange between the low temperature refrigerant that is depressurized in the expansion valve 170 and the heat medium that flows in the heat medium cooling part 40. In the heat exchanger 160, heat is radiated from the gas phase heat medium flowed in the heat medium cooling part 40 and the heat medium is liquefied.

Figure 5:
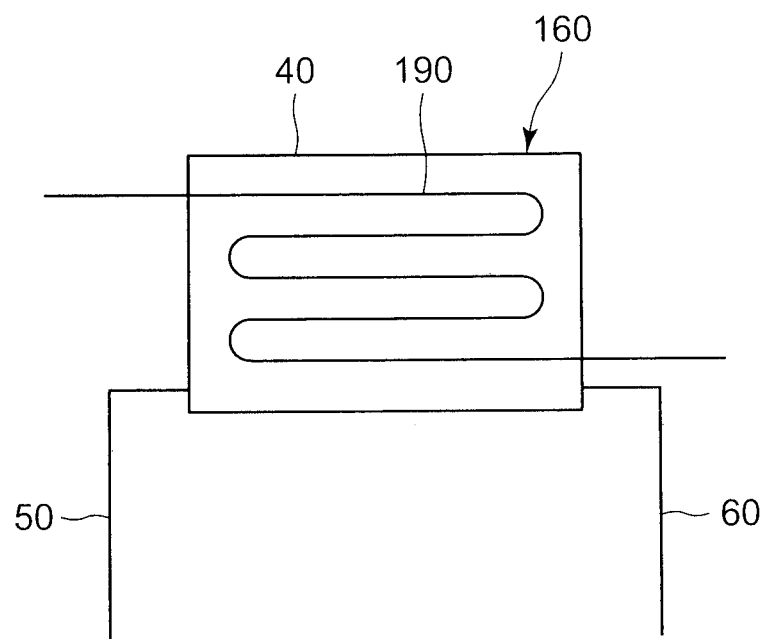
FIG. 5 is a schematic view that shows an example of a structure of a heat exchanger.

FIG. 5 is a schematic view that shows an example of a structure of a heat exchanger 160. The heat exchanger 160 shown in FIG. 5 includes a pipe arrangement 190 arranged inside of the heat medium cooling part 40. The pipe arrangement 190 connects the expansion valve 170 and the accumulator 150. The low temperature refrigerant that has passed the expansion valve 170 flows toward the accumulator 150 via the pipe arrangement 190. The heat medium that flows the heat medium cooling part 40 performs direct heat exchange with the refrigerant that circulates in the refrigerating cycle 100. Therefore, in an example shown in FIG. 5, the heat medium cooling part 40 itself has a function as the heat exchanger 160.

The pipe arrangement 190 has a shape that snakes inside the heat exchanger 160. Therefore, a surface area through which the pipe arrangement 190 comes into contact with the heat medium in the heat medium cooling part 40 becomes larger, and the thermal transfer efficiency from the heat medium to the refrigerant is improved thereby.

Figure 6:
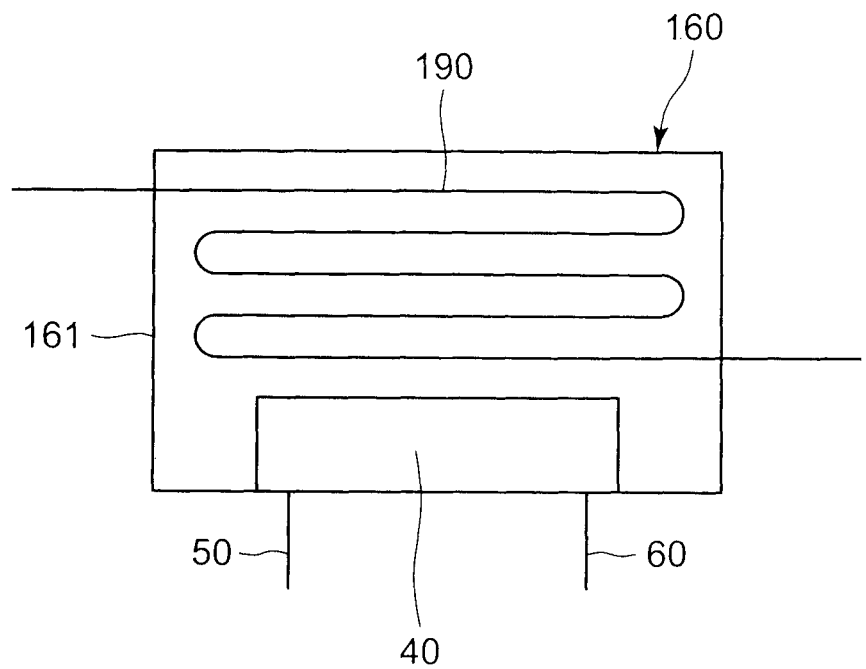
FIG. 6 is a schematic view that shows another example of a structure of a heat exchanger.

FIG. 6 is a schematic view that shows another example of a structure of the heat exchanger 160. The heat exchanger 160 shown in FIG. 6 has a chassis 161. In an internal space of the chassis 161, for example, a liquid such as water or the like is filled. The heat medium cooling part 40 and the pipe arrangement 190 are arranged inside the chassis 161. The pipe arrangement 190 is dipped in a liquid that is filled in the chassis 161. Since the pipe arrangement 190 has a shape that snakes, heat exchange between the refrigerant that flows in the pipe arrangement 190 and a liquid that is filled in the chassis 161 is facilitated.

The liquid that is filled in the chassis 161 is cooled with the low temperature refrigerant that flows in the pipe arrangement 190. The heat medium that flows the heat medium cooling part 40 is cooled by radiating heat to the liquid that is filled in the chassis 161. The heat medium that flows in the heat medium cooling part 40 performs heat exchange with the refrigerant that circulates in the refrigerating cycle 100 via the liquid that is filled in the chassis 161. Since the liquid that is filled in the chassis 161 has the heat storage performance, cooling performance of the heat medium that flows in the heat medium cooling part 40 is suppressed from varying.

The heat medium that flows in the heat medium cooling part 40 may be cooled by any cooler of air cooling type or water cooling type other than an example in which the heat medium that flows in the heat medium cooling part 40 is cooled by heat exchanging with the refrigerant that circulates in the refrigerating cycle 100 that was described with reference to FIG. 4 to FIG. 6.

[Operation of Temperature Controller 10 for Battery]

Figure 7:
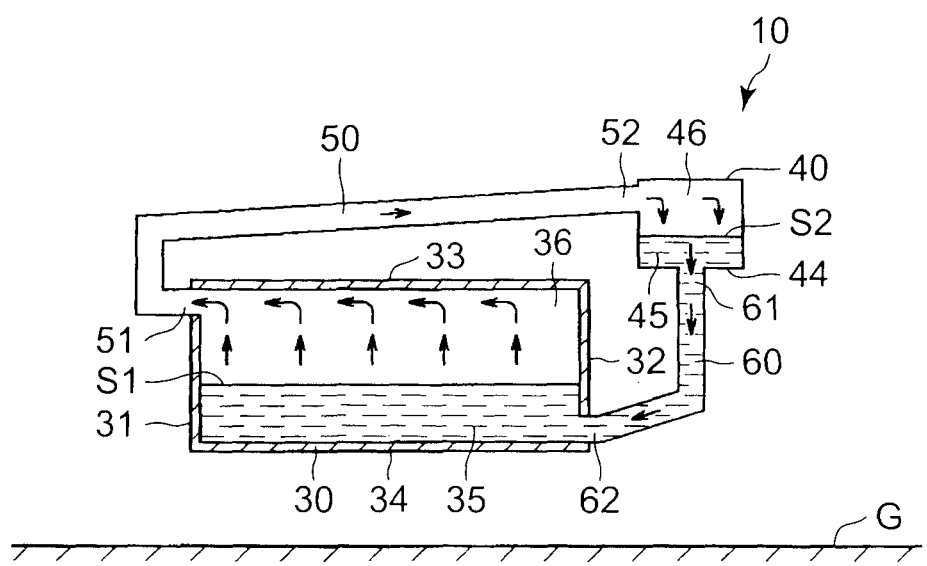
FIG. 7 is a schematic cross-sectional view that shows an operation of the temperature controller for a battery according to the present embodiment during cooling a battery.

An operation when a temperature of a battery 1 is controlled by means of the temperature controller 10 for a battery that is equipped with the structure mentioned above will be described in the following. FIG. 7 is a schematic cross-sectional view that shows an operation during cooling a battery of the temperature controller 10 for a battery according to the present embodiment.

As shown in FIG. 7, the temperature control part 30 is formed into a hollow shape. A part on a lower side of a hollow internal space of the temperature control part 30 forms a liquid phase medium part 35 that accumulates a liquid phase heat medium. A part on an upper side of the hollow internal space of the temperature control part 30 forms a gas phase medium part 36 in which a gas phase heat medium is filled. A liquid surface S1 of the liquid phase heat medium accumulated in the liquid phase medium part 35 forms an interface between the liquid phase medium part 35 and the gas phase medium part 36. The temperature control part 30 is provided in a state in which in a natural state (environmental temperature state), the liquid phase heat medium is accumulated inside thereof and has a function of a liquid reservoir.

The heat medium cooling part 40 is formed into a hollow body. A part on a lower side of a hollow internal space of the heat medium cooling part 40 forms a liquid phase medium part 45 that accumulates the liquid phase heat medium. A part on an upper side of the hollow internal space of the heat medium cooling part 40 forms the gas phase medium part 46 in which a gas phase heat medium is filled. A liquid surface S2 of the liquid phase heat medium accumulated in the liquid phase medium part 45 forms an interface between the liquid phase medium part 45 and the gas phase medium part 46.

Due to a variation of a heat generating state of the battery 1, a variation of cooling capacity of the heat medium in the heat medium cooling part 40, or a variation of an atmospheric temperature, a state of the heat medium in a closed loop-like passage that connects the temperature control part 30 and the heat medium cooling part 40 changes any time. Therefore, a height of the liquid surface S1 in the temperature control part 30 varies any time, and a height of the liquid surface S2 in the heat medium cooling part 40 varies any time. Therefore, neither a specified region in the temperature control part 30 is defined as the liquid phase medium part 35 and the gas phase medium part 36, nor a specified region in the heat medium cooling part 40 is defined as the liquid phase medium part 45 and the gas phase medium part 46. Note that volumes of the liquid phase medium part 35 and the gas phase medium part 36 always vary, and volumes of the liquid phase medium part 45 and the gas phase medium part 46 always vary.

The gas phase flow passage 50 connects the gas phase medium part 36 of the temperature control part 30 and the gas phase medium part 46 of the heat medium cooling part 40. The gas phase flow passage 50 includes an end part 51 on a side that is connected to the temperature control part 30 and an end part 52 on a side that is connected to the heat medium cooling part 40. The end part 51 of the gas phase flow passage 50 is connected to the proximity of an upper end 33 of the temperature control part 30. The end part 52 of the gas phase flow passage 50 is connected to the proximity of an upper end of the heat medium cooling part 40. The gas phase flow passage 50 has a shape that inclines such that a height thereof becomes gradually higher from the end part 51 on a side of the temperature control part 30 to the end part 52 on a side of the heat medium cooling part 40.

The liquid phase flow passage 60 connects the liquid phase medium part 35 of the temperature control part 30 and the liquid phase medium part 45 of the heat medium cooling part 40. The liquid phase flow passage 60 includes an end part 61 on a side that is connected to the heat medium cooling part 40 and an end part 62 on a side that is connected to the temperature control part 30. The end part 61 of the liquid phase flow passage 60 is connected to the proximity of a lower end 44 of the heat medium cooling part 40. The end part 62 of the liquid phase flow passage 60 is connected to the proximity of a lower end 34 of the temperature control part 30. The liquid phase flow passage 60 has a shape that inclines such that a height thereof becomes gradually lower from the end part 61 on a side of the heat medium cooling part 40 to the end part 62 on a side of the temperature control part 30.

In FIG. 7, a ground surface G is illustrated. The temperature control part 30 is arranged so as to extend in a horizontal direction in parallel with the ground surface G. In a vertical direction that is perpendicular to the ground surface G, the heat medium cooling part 40 is arranged in on an upper side than the temperature control part 30. The temperature control part 30 is arranged at a position lower than the heat medium cooling part 40. In an annular passage through which the heat medium is circulated between the temperature control part 30 and the heat medium cooling part 40, the temperature control part 30 is arranged on a lower side, and the heat medium cooling part 40 is arranged on an upper side.

More specifically, the temperature control part 30 and the heat medium cooling part 40 are arranged such that the lower end 44 of the heat medium cooling part 40 is located on an upper side than the upper end 33 of the temperature control part 30. Therefore, the temperature control part 30 and the heat medium cooling part 40 are arranged such that the liquid surface S2 of the liquid phase heat medium in the heat medium cooling part 40 is located on an upper side than the liquid surface S1 of the liquid phase heat medium in the temperature control part 30. The upper end 33 of the temperature control part 30 is arranged at a position lower than the liquid surface S2 of liquid phase heat medium in the heat medium cooling part 40. The lower end 44 of the heat medium cooling part 40 is arranged at a position higher than the liquid surface S1 of the liquid phase heat medium in the temperature control part 30.

When cooling the battery 1, heat generated in each of the battery cells 2 is transferred via the heat sink 20 to the temperature control part 30. The battery 1 is cooled by radiating heat via the heat sink 20 to the heat medium in the temperature control part 30. In the temperature control part 30, the heat medium is heated by receiving the heat transferred from the battery cells 2. When the liquid phase heat medium accumulated in the liquid phase medium part 35 is heated, the heat medium is evaporated, ascends in the temperature control part 30, and moves to the gas phase medium part 36. The temperature control part 30 cools the battery 1 by phase change from a liquid phase to a gas phase of the heat medium and properly controls the temperature of the battery 1. In the gas phase medium part 36, when the gas phase heat medium is further heated, the heat medium becomes a state of superheated vapor, and pressure and temperature of the heat medium rise thereby.

The gas phase heat medium of which pressure is raised in the temperature control part 30 flows out of the temperature control part 30, flows in the gas phase flow passage 50, and moves to the heat medium cooling part 40 via the gas phase flow passage 50. Inside the gas phase flow passage 50, the gas phase heat medium that moves from the temperature control part 30 to the heat medium cooling part 40 flows. Since the gas phase flow passage 50 forms a passage that becomes higher from the end part 51 toward the end part 52, the heat medium is suppressed from staying in the gas phase flow passage 50, and the heat medium ascends in the gas phase flow passage 50 and reaches the heat medium cooling part 40.

The heat medium is cooled in the heat medium cooling part 40, condensed and becomes a liquid phase state. The heat medium cooling part 40 deprives heat from the gas phase heat medium that flows in the gas phase medium part 46 from the gas phase flow passage 50 and condenses the heat medium. When the gas phase heat medium is liquefied and the specific gravity of the heat medium increases thereby, the heat medium descends in the heat medium cooling part 40 and moves to the liquid phase medium part 45.

The liquid phase heat medium, with a positional head between the liquid surface S2 of the liquid phase heat medium in the heat medium cooling part 40 and the liquid surface S1 of the liquid phase heat medium in the temperature control part 30 as a driving force, by an action of gravity, flows out of the heat medium cooling part 40, flows in the liquid phase flow passage 60 and returns to the temperature control part 30 via the liquid phase flow passage 60. Inside the liquid phase flow passage 60, the liquid phase heat medium that proceeds from the heat medium cooling part 40 to the temperature control part 30 flows. At this time, among the liquid phase heat medium, a low temperature heat medium that has relatively large specific gravity preferentially flows out of the heat medium cooling part 40. Since the liquid phase flow passage 60 forms a passage that becomes lower from the end part 61 to the end part 62, the heat medium is suppressed from staying in the liquid phase flow passage 60 and the heat medium descends in the liquid phase flow passage 60 and reaches the temperature control part 30.

Thus, with the temperature control part 30, the heat medium cooling part 40, and the gas phase flow passage 50 and the liquid phase flow passage 60, which connect therebetween, a loop-like thermosiphon type heat pipe is formed. Since the heat medium circulates in a closed circuit due to a reflux flow from the heat medium cooling part 40 to the temperature control part 30 by gravity and there is no need of a driving force necessary for circulation of the heat medium, the battery 1 is efficiently cooled, and a temperature of the battery 1 is properly controlled. Since there is no interference between the gas phase heat medium and the liquid phase heat medium, the radiation performance from the battery 1 is further improved.

Figure 8:
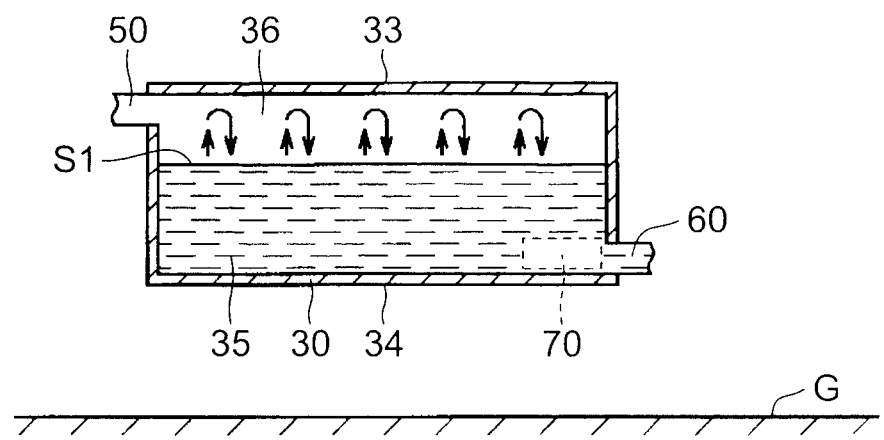
FIG. 8 is a schematic cross-sectional view that shows an operation of the battery temperature controller for a battery according to the present embodiment during raising a battery temperature.

FIG. 8 is a schematic cross-sectional view that shows an operation of the battery temperature controller 10 for battery according to the present embodiment during raising a battery temperature. In the case of the battery 1, when the temperature decreases, since a chemical reaction in the battery 1 is suppressed and output density decreases, when the temperature is low, there is a risk that the output may not be secured. Further, as the characteristics of the battery 1, when left in a low temperature region, an internal electric resistance becomes larger and the input efficiency decreases, a charge time increases, and a battery charge efficiency decreases thereby. Therefore, under a low temperature environment such as a cold area where an ambient temperature is low and the like, a proper temperature increase of the battery 1 is desired in some cases.

When the temperature of the battery 1 is raised, by heating the heat medium in the temperature control part 30, the heat may be transferred to the battery cell 2 via the heat sink 20. For this, the temperature control part 30 of the present embodiment has a heating member 70 for heating the heat medium. As shown in FIG. 8, the heating member 70 is arranged in the proximity of a lower end 34 of the temperature control part 30 and arranged in a position corresponding to the liquid phase medium part 35. The heating member 70 is provided to be able to heat the liquid phase heat medium accumulated in the liquid phase medium part 35 of the temperature control part 30.

When the heating member 70 heats the liquid phase heat medium, since the inside of the temperature control part 30 is in a vacuum pressure reduction state, the heated heat medium is readily vaporized. As shown in FIG. 1, since the temperature control part 30 is in contact with the side wall plate part 22 of the heat sink 20 in an entirety in a vertical direction thereof, air bubbles generated in the liquid phase heat medium are liquefied again by transferring the heat to the side wall plate part 22 on site. A part of the air bubbles ascends in the liquid phase heat medium and moves from the liquid surface S1 to the gas phase medium part 36. In the gas phase medium part 36, the evaporated heat medium, when discharging a latent heat of condensation to the side wall plate part 22 and being condensed thereby, causes a state change to a liquid phase, and refluxes to the initial liquid phase medium part 35.

Thus, the heat transport from the heat medium to the side wall plate part 22 of the heat sink 20 is repeatedly performed, and, by sequentially going through the side wall plate part 22 and the interlayer plate part 21, the heat is transferred to the battery cells 2. The temperature control part 30 heats the battery 1 by phase change of the heat medium from a liquid phase to a gas phase. Thus, the temperature of the battery 1 rises and the temperature of the battery 1 is properly controlled. At this time, since the heat medium flows only the inside of the temperature control part 30 and does not moves to the heat medium cooling part 40, the heat can be transferred only to the battery 1 that needs to be heated, it is efficient.

[Action and Effect]

Next, effects of the present embodiment will be described.

According to the temperature controller 10 for a battery of the present embodiment, as shown in FIG. 7, the temperature control part 30 and the heat medium cooling part 40 are arranged such that the liquid surface S2 of the liquid phase heat medium in the heat medium cooling part 40 is located on an upper side than the liquid surface S1 of the liquid phase heat medium in the temperature control part 30. Thus, a bottom heat thermosiphon type heat pipe that has the temperature control part 30 as a heating part and the heat medium cooling part 40 as a cooling part is formed. Since the heat medium naturally circulates between the temperature control part 30 and the heat medium cooling part 40 due to a difference in height of liquid surfaces of the liquid phase heat medium, there is no need of a mechanical mechanism such as a pump or a compressor for circulating the heat medium, and manufacturing cost of a device and power expense during operation can be reduced thereby. Since the heat pipe is a loop type in which the flow passage of the gas phase heat medium and the flow passage of the liquid phase heat medium are separated, the heat medium can be circulated at a high-speed and the temperature of the battery 1 can be efficiently controlled.

As the heat medium that is encapsulated in the heat pipe, when a heat medium that is a gas under normal temperature and normal pressure is used, should the heat medium leaks, since the heat medium vaporizes instantaneously, the insulating property of the battery 1 can be secured and short-circuiting can be suppressed from occurring.

Further, as shown in FIG. 7, the temperature control part 30 and the heat medium cooling part 40 are arranged such that the lower end 44 of the heat medium cooling part 40 is located on an upper side than the upper end 33 of the temperature control part 30. Thus, a difference in height between the liquid surface S1 of the liquid phase heat medium in the temperature control part 30 and the liquid surface S2 of the liquid phase heat medium in the heat medium cooling part 40 increases. Therefore, a head that refluxes the liquid phase heat medium from the heat medium cooling part 40 to the temperature control part 30 increases, and the heat medium can be more surely naturally circulated.

Further, as shown in FIG. 1, the temperature control part 30 extends along a longitudinal direction of the battery 1. In this case, since the temperature control part 30 has a structure in which the liquid phase heat medium is always accumulated therein, uniformity of heat exchange between the heat medium in the temperature control part 30 and the battery 1 in the longitudinal direction of the battery 1 can be improved, and the temperature variation in the longitudinal direction of the battery 1 can be reduced thereby. Since the temperature control capability of the battery 1 due to the temperature controller 10 for battery can be uniformalized in the longitudinal direction of the battery 1, the uniformity of a temperature distribution in the battery 1 can be improved.

Since the temperature control part 30 has a structure that always accumulates the liquid phase heat medium inside thereof, a heat capacity of the battery 1 can be made larger.

When an extending direction of the temperature control part 30 is set in a horizontal direction as shown in FIG. 7, the liquid surface S1 can be suppressed from inclining with respect to the extending direction of the temperature control part 30. When the liquid surface S1 inclines, a bias of an amount of the liquid phase heat medium in the extending direction of the temperature control part 30 is generated, and, at a position in which an amount of the liquid phase heat medium is large and a position in which an amount of the liquid phase heat medium is small, cooling capacity of the battery 1 becomes irregular. There, when the temperature control part 30 is flatly arranged, in the extending direction of the temperature control part 30, that is, in the longitudinal direction of the battery 1, uniformity of the heat exchange between the heat medium in the temperature control part 30 and the battery 1 can be further improved. In addition, by arranging an exit of the heat medium from the temperature control part 30 lower than an inlet of the heat medium to the temperature control part 30, the heat medium can be suppressed from flowing back.

Further, as shown in FIG. 1 and FIG. 7, the gas phase flow passage 50 is connected to one end part 31 of the temperature control part 30 in the extending direction and the liquid phase flow passage 60 is connected to the other end part 32. Thus, since a joint part of the gas phase flow passage 50 to the temperature control part 30 and a joint part of the liquid phase flow passage 60 are arranged at separated positions, the gas phase and liquid phase heat media can be circulated over an entirety in the extending direction of the temperature control part 30.

Still further, as shown in FIG. 1, the battery 1 has a plurality of the battery cells 2, and the battery cells 2 are stacked in the longitudinal direction of the battery 1. In this case, since the temperature control part 30 extends in the longitudinal direction of the battery 1, that is, in the stacking direction S of the plurality of battery cells 2, each of the plurality of the battery cells 2 can be efficiently temperature controlled. Since without generating a temperature difference between the plurality of the battery cells 2, all the battery cells 2 can be uniformly temperature controlled to the equivalent temperature, the uniformity of the temperature distributions of the plurality of the battery cells 2 can be improved.

Further, as shown in FIG. 2, 3, the temperature controller 10 for a battery further includes the heat sink 20. The heat sink 20 comes into contact with the temperature control part 30 and is arranged between a plurality of battery cells 2. By doing so, since heat radiation and heat absorption from between the battery cells 2 are enabled, the heat transfer efficiency between each of the battery cells 2 and the heat medium can be improved.

By interposing the heat sink 20 between the temperature control part 30 and the battery 1, as shown in FIG. 3, the temperature control part 30 is arranged separated from the battery 1. The battery 1, when charge and discharge are repeated, may deform by expansion of the battery cells 2 due to an increase in internal pressure in some cases. Since the temperature control part 30 has a structure in which it comes into thermal contact with the battery 1 by interposing the heat sink 20, even if the battery 1 is deformed, without affecting on the temperature control part 30, the heat exchange between the battery 1 and the heat medium can be similarly performed. The heat sink 20 has a structure in which the tabular interlayer plate part 21 is sandwiched between two battery cells 2. Therefore, even if the battery 1 is deformed, the contact between the battery cell 2 and the interlayer plate part 21 can be maintained, and the heat exchange efficiency between the battery 1 and the heat medium can be suppressed from decreasing thereby.

As shown in FIG. 7, the liquid phase flow passage 60 inclines so as to be lower from the heat medium cooling part 40 to the temperature control part 30. Thus, since the liquid phase heat medium liquefied in the heat medium cooling part 40 is easy to move to the temperature control part 30, circulation of the heat medium between the temperature control part 30 and the heat medium cooling part 40 can be facilitated, and the temperature of the battery 1 can be more efficiently controlled thereby. The liquid phase flow passage 60 is not necessary to incline with respect to a horizontal direction in entirety from the end part 61 to the end part 62 but may include a part that extends in a horizontal direction.

Further, as shown in FIG. 7, the gas phase flow passage 50 inclines so as to be higher from the temperature control part 30 to the heat medium cooling part 40. Thus, since the gas phase heat medium that is evaporated in the temperature control part 30 is easy to move to the heat medium cooling part 40, circulation of the heat medium between the temperature control part 30 and the heat medium cooling part 40 can be facilitated, and the temperature of the battery 1 can be more efficiently controlled thereby. The gas phase flow passage 50 is not necessary to incline with respect to a horizontal direction in entirety from the end part 51 to the end part 52 but may include a part that extends in a horizontal direction.

When the end part 51 of the gas phase flow passage 50 is arranged at a position higher than the liquid surface S1 of the liquid phase heat medium in the temperature control part 30, the gas phase flow passage 50 is arranged so as to be gradually higher from the end part 51 to the end part 52, and the end part 62 of the liquid phase flow passage 60 is arranged at a position lower than the liquid surface S1, the liquid phase flow passage 60 is arranged so as to be gradually higher from the end part 62 to the end part 61, a circulation flow due to a repetition of vaporization and liquefaction of the heat medium can be formed. When the circulation flow of the heat medium is formed, since the heat can move at a high-speed due to a volume expansion of the heat medium, performance of the temperature controller 10 for a battery can be improved.

As shown in FIG. 1, the gas phase flow passage 50 is arranged separated from the battery 1. When the battery 1 is cooled, inside the gas phase flow passage 50, the heat medium in a superheated vapor state, which was evaporated in the temperature control part 30 and of which pressure and temperature rose flows. When the gas phase flow passage 50 is arranged separated from the battery 1, since a defect that heat transfer from the heat medium that flows in the gas phase flow passage 50 to the battery 1 is generated, and the battery 1 is heated thereby can be suppressed from occurring, the temperature of the battery 1 can be more efficiently controlled.

As shown in FIG. 1, the temperature control part 30 includes the heating member 70 for heating the heat medium. Thus, according to a simple structure in which the heating member 70 is simply added to the temperature control part 30 that forms a heat pipe that is used to cool the battery 1, the battery 1 can be evenly heated. Therefore, the temperature controller 10 for a battery that deals with both cooling and heating of the battery 1 can be realized. Further, at this time, the battery 1 can be uniformly heated.

Further, as shown in FIG. 8, the heating member 70 heats the liquid phase heat medium accumulated in the temperature control part 30. By doing so, since the liquid phase heat medium can be actively heated with the heating member 70, by efficiently heating the temperature control part 30, the heat transfer to the battery 1 can be facilitated.

Embodiment 2

In the embodiment 1 described above, an example in which the temperature control part 30 extends in a horizontal direction was described. When the battery 1 is mounted on a vehicle and also the temperature controller 10 for a battery is mounted on a vehicle, accompanying a variation of a running state of a vehicle, a position of the temperature controller 10 for a battery with respect to a horizontal plane varies. Specifically, between when a vehicle ascends a slope and when a vehicle descends a slope, an inclination of the vehicle is largely different.

In order to realize a natural circulation of the heat medium of the temperature controller 10 for a battery in any vehicle posture, the end part 62 at which the liquid phase flow passage 60 is connected to the temperature control part 30 is necessary to be positioned in a lower place than the liquid surface S1 of the liquid phase heat medium in the temperature control part 30 in a vertical direction. In order to assuredly realize such an arrangement, the temperature control part 30 may be inclined in advance not by setting horizontally.

Figure 9:
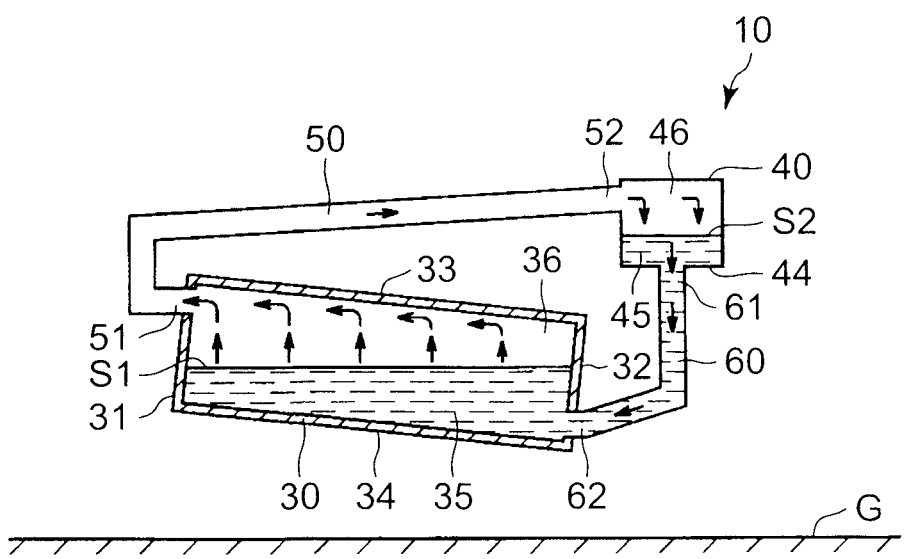
FIG. 9 is a schematic cross-sectional view that shows a structure of a temperature controller for a battery according to an embodiment 2.

FIG. 9 is a schematic cross-sectional view that shows a structure of the temperature controller 10 for a battery according to embodiment 2. Compared with the temperature control part 30 shown in FIG. 7, the temperature control part 30 according to embodiment 2 shown in FIG. 9 is arranged by inclining such that an end part 32 to which the end part 62 of the liquid phase flow passage 60 is connected is on a lower side, and the end part 31 to which the end part 51 of the gas phase flow passage 50 is connected is on an upper side.

By doing so, even in the case where the vehicle inclines, in a vertical direction, the end part 51 is arranged above the liquid surface S1, the end part 62 is arranged lower than the liquid surface S1, and the end part 52 at which the gas phase flow passage 50 is connected to the heat medium cooling part 40 can be arranged higher than the end part 61 of the liquid phase flow passage 60. Therefore, the natural circulation of the heat medium can be realized. In addition, a defect that a circulation direction of the heat medium is reversed and the heat exchange performance in the heat medium cooling part 40 is degraded thereby can be more assuredly evaded.

Although embodiments of the present invention were described as described above, the embodiments disclosed this time should be considered as illustrations in all points and are not restrictive. The range of the present invention is shown not by the description described above but by the range of claims, and it is intended to include meanings equivalent to the range of claims and all modifications in the range.

The temperature controller for a battery of the present invention can be particularly advantageously applied to control a temperature of a battery mounted on a vehicle such as a hybrid vehicle, a fuel cell vehicle, an electric vehicle or the like.

The invention claimed is:

1. A temperature controller for a battery, the temperature controller comprising:
    a temperature control part which is a liquid reservoir and is configured to control a temperature of the battery by a phase change of a heat medium between a liquid phase and a gas phase during cooling of the battery;
    a gas phase flow passage through which a gas phase heat medium that flows out of the temperature control part flows;
    a heat medium cooling part configured to condense the gas phase heat medium that flows in from the gas phase flow passage; and
    a liquid phase flow passage through which a liquid phase heat medium flows from the heat medium cooling part to the temperature control part,
    wherein:
    the battery is provided on a vehicle,
    the temperature control part and the heat medium cooling part are arranged such that a liquid surface of the liquid phase heat medium in the heat medium cooling part is positioned relatively higher than a liquid surface of the liquid phase heat medium in the temperature control part, and
    the temperature control part includes an upper surface and a lower surface, and each of the upper surface and the lower surface is inclined with respect to a ground surface on which the vehicle is positioned, and
    the liquid phase flow passage includes an end part connected to a first end part of the temperature control part and the gas phase flow passage includes an end part connected to a second end part of the temperature control part that is located on an opposite side of the temperature control part than the first end part, and a first connection point where the end part of the liquid phase flow passage connects with the first end part of the temperature control part is lower than a second connection point wherein the end part of the gas phase flow passage connects with the second end part of the temperature control part.

2. The temperature controller according to claim 1, wherein the temperature control part and the heat medium cooling part are arranged such that a lower end of the heat medium cooling part is positioned higher than an upper end of the temperature control part.

3. The temperature controller according to claim 1, wherein the liquid phase flow passage inclines downward from the heat medium cooling part to the temperature control part.

4. The temperature controller according to claim 1, wherein the gas phase flow passage inclines upward from the temperature control part to the heat medium cooling part.

5. The temperature controller according to claim 1, wherein the temperature control part includes a heating member that heats the heat medium.

6. The temperature controller according to claim 5, wherein the heating member heats the liquid phase heat medium accumulated in the temperature control part.

7. A battery system including a battery and a temperature controller for a battery,
    the battery comprising an outer side surface, and
    the temperature controller comprising:
    a temperature control part that is a liquid reservoir and is configured to control a temperature of the battery by a phase change of a heat medium between a liquid phase and a gas phase during cooling of the battery, wherein the temperature control part is disposed outside of the battery and facing the outer side surface of the battery;
    a gas phase flow passage through which a gas phase heat medium that flows out of the temperature control part flows;
    a heat medium cooling part configured to condense the gas phase heat medium that flows in from the gas phase flow passage; and
    a liquid phase flow passage through which a liquid phase heat medium flows from the heat medium cooling part to the temperature control part,
    wherein:
    the temperature control part and the heat medium cooling part are arranged such that a liquid surface of the liquid phase heat medium in the heat medium cooling part is positioned higher than a liquid surface of the liquid phase heat medium in the temperature control part, and
    the temperature control part includes an upper surface and a lower surface, and each of the upper surface and the lower surface is inclined with respect to the battery, and an end part of the temperature control part to which the liquid phase flow passage is connected is lower than another end part of the temperature control part to which the gas phase flow passage is connected.

8. The battery system according to claim 7, wherein the temperature control part extends along a longitudinal direction of the battery.

9. The battery system according to claim 8, wherein the battery has a plurality of cells and the cells are stacked in a longitudinal direction of the battery.

10. The battery system according to claim 9, further comprising:
    a heat sink that comes into contact with the temperature control part and is arranged between the plurality of the cells.

11. The battery system according to claim 7, wherein the gas phase flow passage is arranged separated from the battery.

* * * * *